United States Patent
Hayt et al.

(10) Patent No.: US 12,498,741 B2
(45) Date of Patent: Dec. 16, 2025

(54) LEVEL CONTROLLER

(71) Applicant: Kimray, Inc., Oklahoma City, OK (US)

(72) Inventors: Dustin Kyle Hayt, Oklahoma City, OK (US); Stephen Andrew Folmar, Oklahoma City, OK (US)

(73) Assignee: KIMRAY, INC., Oklahoma City, OK (US)

( * ) Notice: Subject to any disclaimer, the term of this patent is extended or adjusted under 35 U.S.C. 154(b) by 167 days.

(21) Appl. No.: 18/215,874

(22) Filed: Jun. 29, 2023

(65) Prior Publication Data

US 2025/0004487 A1   Jan. 2, 2025

(51) Int. Cl.
| | |
|---|---|
| *G05D 9/02* | (2006.01) |
| *C10G 75/00* | (2006.01) |
| *F16K 24/04* | (2006.01) |
| *F16K 33/00* | (2006.01) |
| *G05D 9/12* | (2006.01) |

(52) U.S. Cl.
CPC .............. *G05D 9/02* (2013.01); *C10G 75/00* (2013.01); *F16K 24/048* (2013.01); *F16K 33/00* (2013.01); *G05D 9/12* (2013.01); *C10G 2300/4075* (2013.01)

(58) Field of Classification Search
CPC ...... F16K 24/042; F16K 24/048; F16K 31/24; F16K 31/26; F16K 33/00; G05D 9/02; G05D 9/12; C10G 75/00; C10G 2300/4075
See application file for complete search history.

(56) References Cited

U.S. PATENT DOCUMENTS

| | | | | |
|---|---|---|---|---|
| 3,016,094 | A | | 1/1962 | Abbott |
| 3,120,240 | A | * | 2/1964 | Kreuter ................ F16K 31/26 137/448 |
| 5,372,722 | A | * | 12/1994 | Schwering ............ B01D 65/02 210/636 |
| 5,992,448 | A | | 11/1999 | Anderson et al. |
| 6,354,323 | B1 | | 3/2002 | Anderson |
| 7,392,822 | B2 | * | 7/2008 | Kimmell ................ F16K 31/18 137/413 |
| 8,091,580 | B2 | * | 1/2012 | Gentry ................... F16K 31/18 137/485 |
| 2013/0333775 | A1 | * | 12/2013 | Shoval ................... F16K 31/22 137/488 |
| 2014/0076425 | A1 | * | 3/2014 | Filler ..................... G05D 16/06 137/488 |

FOREIGN PATENT DOCUMENTS

| | | |
|---|---|---|
| CN | 201386521 Y | 1/2010 |
| CN | 201943657 U | 8/2011 |
| CN | 202284220 U | 6/2012 |
| CN | 210564465 U | 5/2020 |

* cited by examiner

*Primary Examiner* — Kelsey E Cary
(74) *Attorney, Agent, or Firm* — McAfee & Taft

(57) ABSTRACT

A liquid level controller system and process wherein the liquid level controller is attached to a separator vessel so as to monitor fluid level within the separator vessel. The liquid level controller is configured such that hydrocarbon deposits, which hydrocarbon deposits build up in the d displacer arm chamber of the level controller, and be cleaned out without disconnecting the liquid level controller from the separator vessel and without disconnecting the displacer arm assembly from the pilot assembly.

15 Claims, 4 Drawing Sheets

LEVEL CONTROLLER

FIELD OF THE INVENTION

The current invention relates generally to fluid level sensing systems, and in particular to apparatuses and processes related to systems for controlling hydrocarbon fluid levels.

BACKGROUND OF THE INVENTION

The oil and gas, chemical and other industries utilize process valves for the control of process fluids which are operated by means of a pneumatic or electrical control signal. These level controllers typically include a pilot valve whose function is to generate an output signal pressure which either opens or closes the process valve. Typical, the level of liquid in a tank or other container is sensed with a displacement element or float that is in communication with the liquid in the container. The displacement element transmits a force or movement to the controller that is situated outside the container. The force or displacement so sensed is a measure of the change in liquid level.

For example, in the case of an oil and gas separator vessel, a liquid level controller is provided which uses a displacer and displacement arm assembly to transmit changes in the liquid level in the tank to a pilot valve outside the vessel. The pilot valve signals a process control or discharge valve in the discharge outlet from the vessel to open or close the discharge valve in response to the liquid level within the vessel.

Supply gas is generally taken from the production gas and routed to the pilot valve. When the liquid level in the vessel is within the desired limit, the supply gas is vented through the pilot valve to the atmosphere. When the liquid level rises sufficiently to change the position of the float, a flapper applies a force to the pilot valve so that the supply gas is diverted within the pilot valve to thereby provide a control signal to the discharge valve which allows liquid to flow from the vessel.

Generally, at least portions of the displacement arm assembly are exposed to hydrocarbons in the separator vessel. This leads to hydrocarbon (or paraffin) being deposited on components of displacement arm assembly, such as the displacement arm and the displacement arm chamber. Eventually, these hydrocarbon deposits must be removed to ensure accurate and safe operation of the level control system. Unfortunately, this has required at least dismounting the displacement arm assembly from the separator vessel and/or from the pilot assembly. Accordingly, easier clean-out methods are needed.

SUMMARY OF THE INVENTION

In one aspect, the current disclosure is directed to a liquid level controller comprising a pilot assembly and a displacer arm assembly. The displacer arm assembly is operably attached to the pilot assembly. The displacer arm assembly as a mounting body and displacer arm.

The mounting body is configured for connection to a separator vessel. The mounting body defines a chamber at least partially containing a displacer arm. The chamber is in fluid flow communication with the separator vessel when the mounting body is connected to the separator vessel. The mounting body has a clean-out port configured to allow access to the chamber for cleaning hydrocarbon deposits out of the chamber, where the hydrocarbon deposits accumulate when the liquid level is operated in connection with the separator vessel. During use with the separator vessel the displacer arm extends through at least a portion of the chamber and into the separator vessel.

In embodiments of the liquid level controller, the clean-out port is configured to allow access to the chamber for cleaning hydrocarbon deposits out of the chamber without removal of the mounting body from the separator vessel and without removal of the mounting body from the pilot assembly.

In the above embodiments, the mounting body can be tubular and the chamber is generally tubular. Accordingly, the mounting body has a first end, which during use is connected to the separator vessel with the displacer arm extending through at least a portion of the chamber and into the separator vessel, and an opposing second end. The clean-out port can be located at the second end.

In the above embodiments, the displacer arm assembly further comprises a removal plug, which seals the clean-out port during operation of the liquid level controller, and which can be removed during clean out of the chamber. The removal plug can be screw mounted into the clean-out port.

In other embodiments, there is a process for operating the above described embodiments of the liquid level controller. The process comprises the steps of:

attaching the liquid level controller to a separator vessel so as to monitor fluid level within the separator vessel, wherein the displacer arm moves in relation to fluid level in the separator vessel and is operably connected to the pilot assembly so as to convey fluid level information to the pilot assembly; operating the separator vessel and liquid level controller, wherein during such operation the displacer arm conveys the fluid level information and hydrocarbon deposits build up in the chamber; stopping operation of the separator vessel and liquid level controller; and cleaning out the hydrocarbon deposits without disconnecting the liquid level controller from the separator vessel and without disconnecting the displacer arm assembly from the pilot assembly.

Typically, after the step of cleaning out hydrocarbon deposits, the process comprising renewing operation of the separator vessel and liquid level controller.

Generally, during the process, the chamber is in fluid flow communication with the separator vessel when the mounting body is connected to the separator vessel, and the mounting body has a clean-out port configured to allow access to the chamber for cleaning hydrocarbon deposits out of the chamber. Thus, the step of cleaning out the hydrocarbon deposits generally comprises removing a plug from the clean-out port so as to access the chamber.

Further, the process comprises that during operation the separator vessel and the chamber are pressurized above atmospheric pressure and wherein the step of stopping operation comprises depressurizing the separator vessel and the chamber.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DESCRIPTION OF EXEMPLARY EMBODIMENTS

The present disclosure may be understood more readily by reference to this detailed description as well as to the examples included herein. In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

Figure 1:
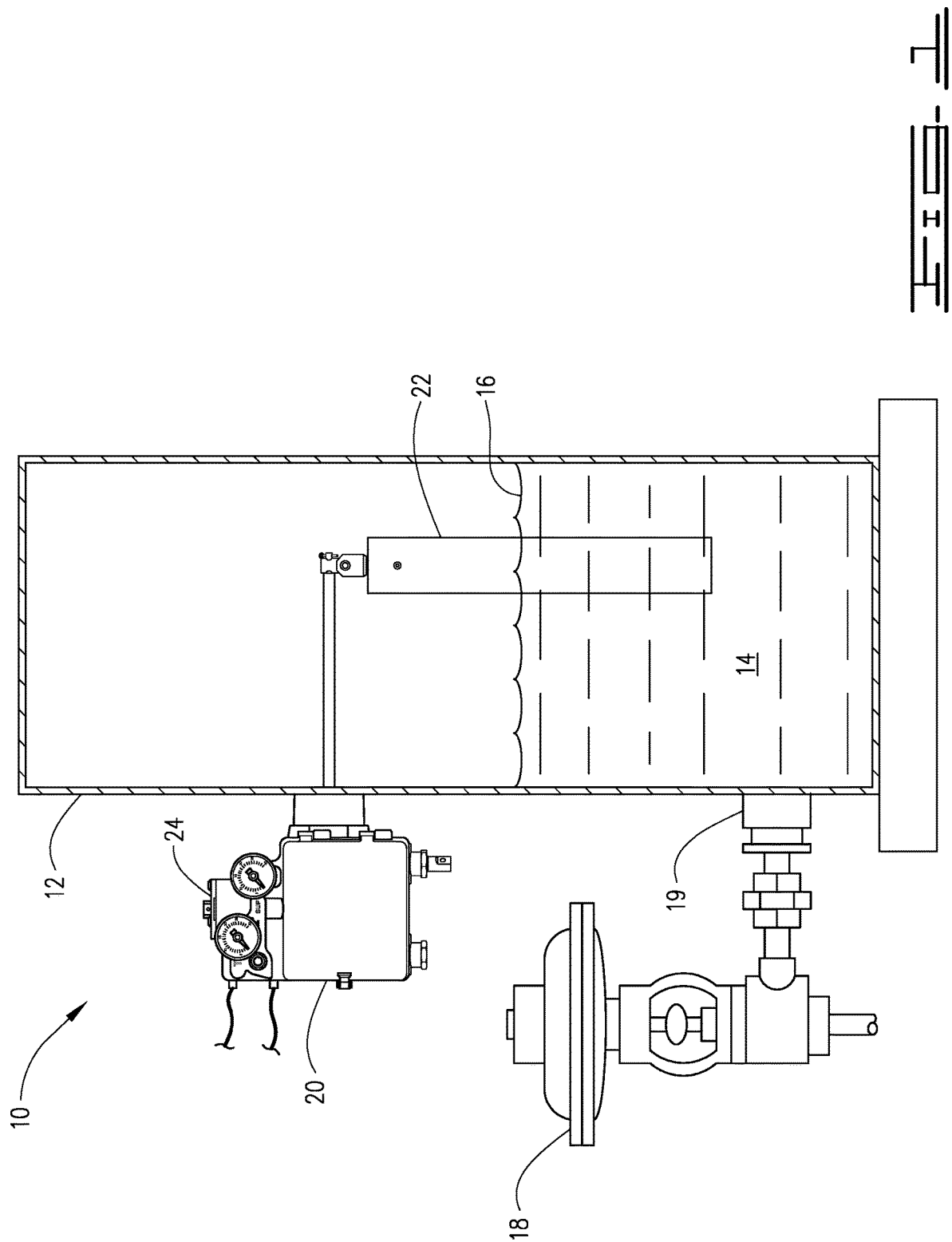
FIG. 1 is a schematic illustration of a system using a level controller in accordance with this disclosure.

Turning now to FIG. 1, a system 10 using a level controller 20 in accordance with this disclosure is illustrated. The oil and gas, chemical and other industries utilize process valves for the control of process fluids which are operated by means of a pneumatic or electrical control signal. For example, the level of liquid in a tank or other vessel 12, is sensed with a sensing element or float 22 that is in communication with liquid 14 in vessel 12 and which transmits a force or movement to a pilot assembly 24. The force or displacement so sensed is a measure of the change in liquid level 16.

For instance, in the case of an oil and gas separator vessel 12, a liquid level controller 20 is provided which uses a float or displacement type sensing element 22 to transmit changes in the liquid level 16 in the vessel 12 to a pilot assembly 24. The pilot assembly 24 signals a process control or discharge valve 18 in the discharge outlet 19 from the vessel 12 to open or close discharge valve 18 in response to liquid level 16 within the vessel 12.

For example, in such a system, supply gas pressure can be taken from the production gas and routed to pilot assembly 24. When liquid level 16 in vessel 12 is within the desired limit, the supply gas is vented through the pilot valve within pilot assembly 24 to the atmosphere. When liquid level 16 rises sufficiently to change the position of float 22, the flapper applies a force to the pilot valve in pilot assembly 24 so that the supply gas is diverted within the pilot valve to thereby provide a control signal to discharge valve 18 which allows liquid to flow from vessel 12.

Figure 2:
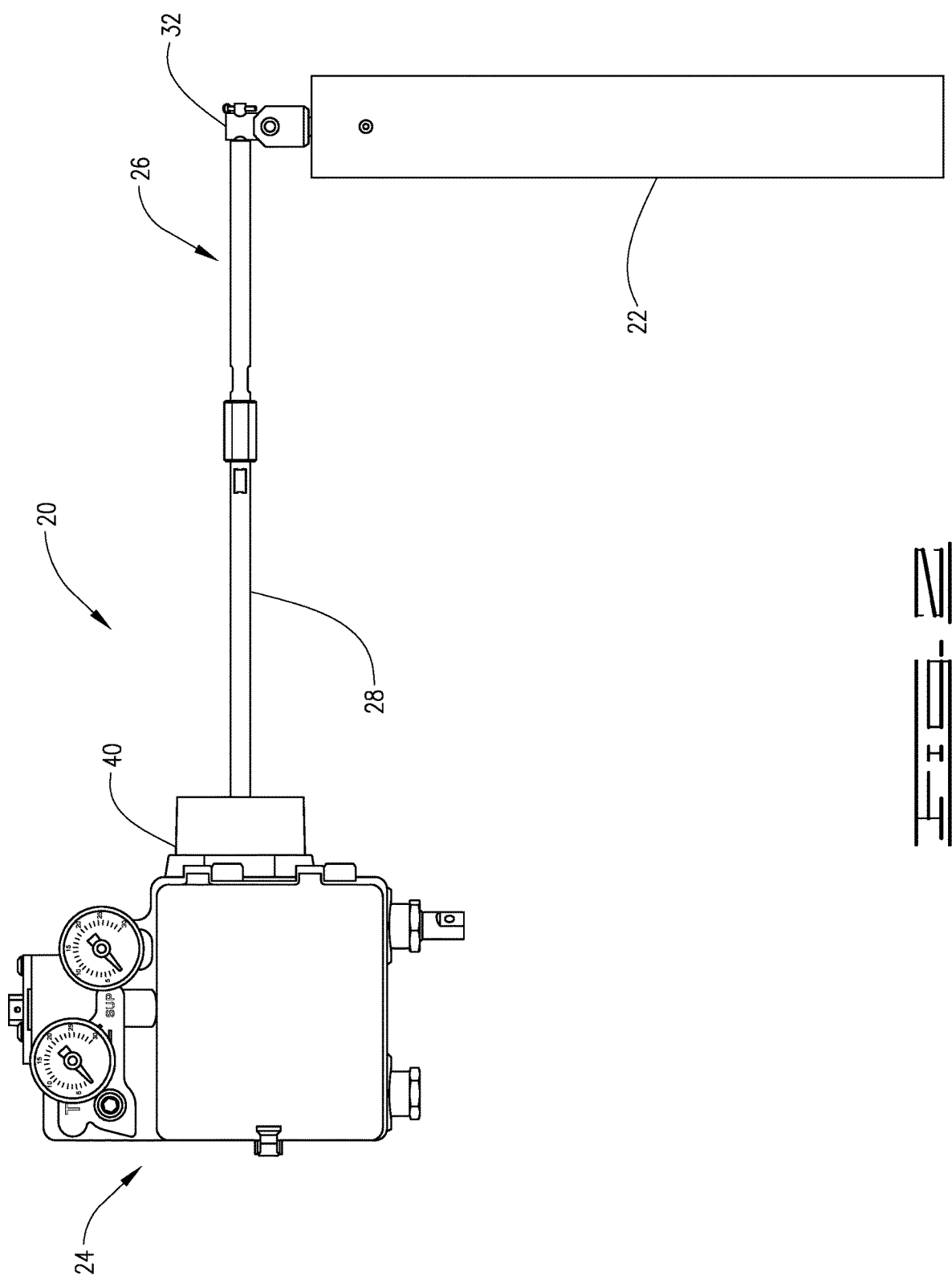
FIG. 2 is a left-side view of a level controller in accordance with this disclosure.

Turning now to FIG. 2, the liquid level controller 20 of this disclosure is illustrated. Liquid level control has a pilot assembly 24 and a displacer arm assembly 26. Pilot assembly 24 can be any suitable pilot assembly known in the art and can be pneumatically, hydraulically or electrically operated. Pilot assembly 24 typically includes a pilot valve whose function is to send an output signal pressure to the pneumatic controller, which either opens or closes the process valve. Additionally, Pilot assembly 24 receives liquid level information from displacer arm assembly 26. Such information is the basis for the output signal.

Displacer arm assembly 26 is operably attached to pilot assembly 24. Displacer arm assembly 26 has a mounting body 40 configured for connection to vessel 12. Additionally, displacer arm assembly 26 has displacer arm 28 which terminates at a first end 30 within mounting body 40 and terminates at a second end 32, which during operation is within vessel 12. Float 22 is generally attached at second end 32.

Figure 3:
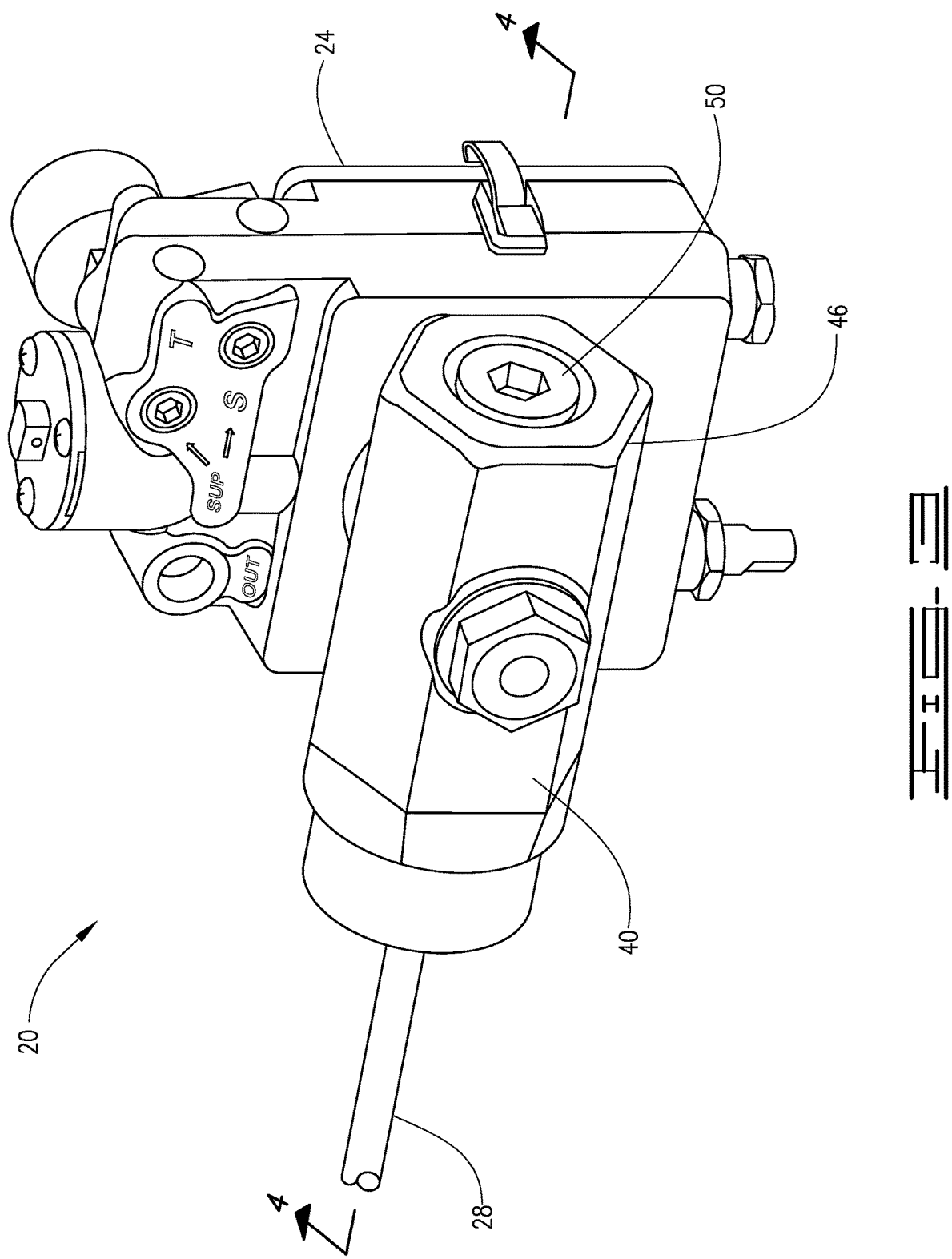
FIG. 3 is a right-side perspective-view of the level controller of FIG. 2.
Figure 4:
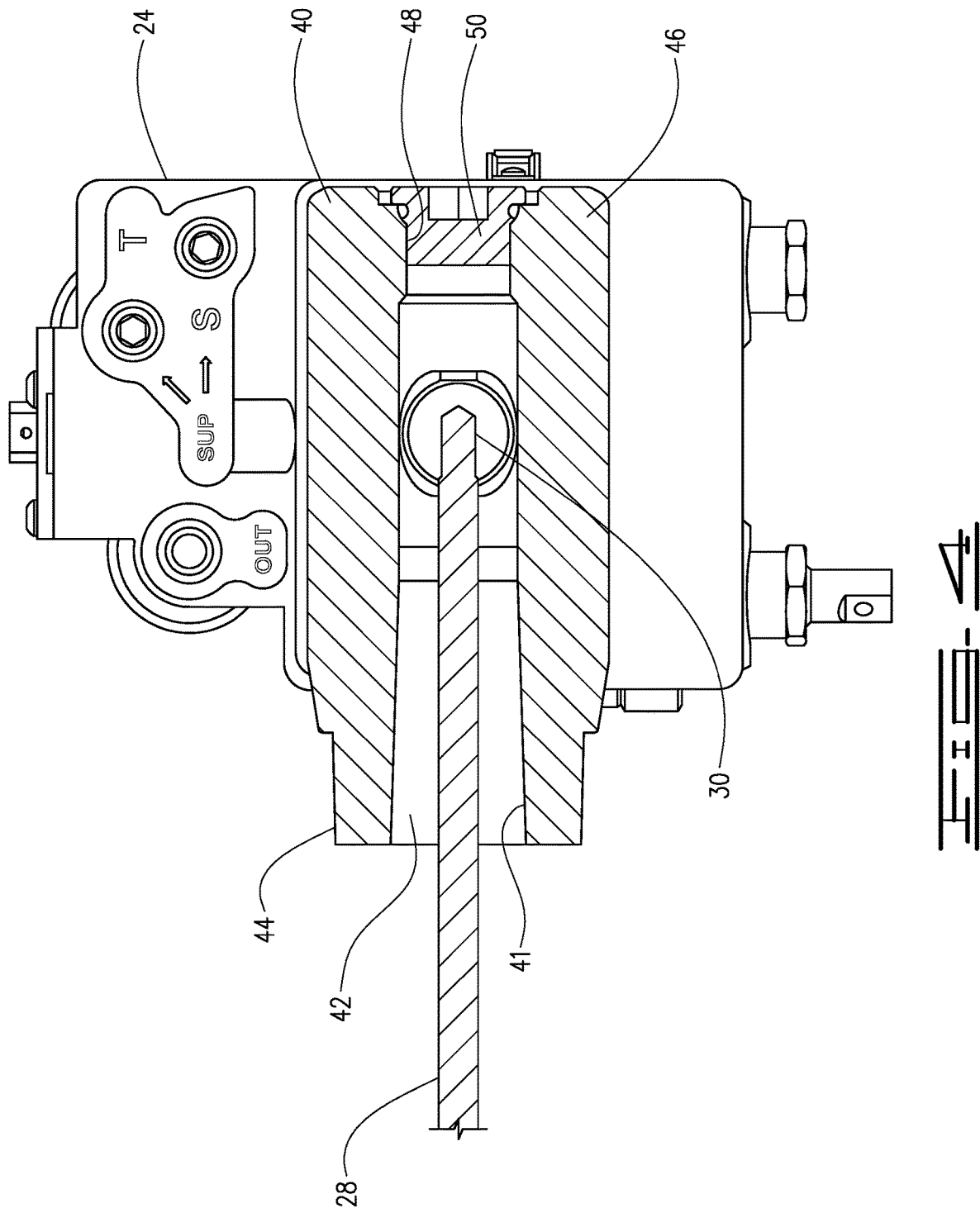
FIG. 4 is right-side cross-sectional view of the level controller of FIG. 2.

From FIGS. 3 and 4 the arrangement of the displacer arm assembly 26 can be better understood. Mounting body 40 defines a chamber 42. At least a portion of displacer arm 28 extends into this chamber 42 and is operationally connected at first end 30 to pilot assembly 24 so as to convey information on fluid level 16 in vessel 12. A first end 44 of mounting body 40 is configured to be attached to the vessel 12 in a fluid tight seal. Thus, chamber 42 is in fluid flow communication with the separator vessel when the mounting body is connected to the separator vessel, which includes during operation of the vessel 12 and liquid level controller 20. Generally, chamber 42 can be tubular in shape and can have a conical aspect to it so that chamber 42 is wider near first end 44 than the remaining portion of chamber 42. Additionally, mounting body 40 can have a tubular shape.

During such operation, displacer arm assembly 26 is exposed to hydrocarbons in vessel 12. This leads to hydrocarbon (or paraffin) being deposited on components of displacer arm assembly 26, such as displacer arm 28 and wall(s) 41 of chamber 42. Eventually, these hydrocarbon deposits must be removed to ensure accurate and safe operation of the level control system. Prior art liquid level controllers required at least dismounting the displacer arm assembly from the separator vessel and/or from the pilot assembly. Advantageously, the current liquid level control allows clean out of hydrocarbon deposits from chamber 42 without removal of the displacer arm assembly 26 from vessel 12.

To this end, mounting body 40 has a clean-out port 48, which as illustrated is located at a second end 46, which opposes first end 44. Clean-out port 48 is configured to allow access to chamber 42 for cleaning hydrocarbon deposits out of chamber 42 and/or off of the portion of displacer arm 28 within chamber 42. As will be realized from this disclosure, clean-out port 48 is configured to allow access to chamber 42 for cleaning hydrocarbon deposits out of chamber 42 without removal of mounting body 40 from vessel 12 and without removal of mounting body 40 from pilot assembly 24.

Typically, clean-out port 48 is sealed with a removal plug 50, which seals clean-out port 48 with a fluid-tight seal during operation of liquid level controller 20 and vessel 12. Plug 50 can be removed during clean out of chamber 42. For example, removal plug 50 can be screw mounted into clean-out port 48.

In one example of a process for operating the above described liquid level controller, the process comprises attaching liquid level controller 20 to a separator vessel 12 so as to monitor fluid level within separator vessel 12. Subsequently, the separator vessel 12 and liquid level controller 20 are operated such that, during such operation, the displacer arm 28 conveys the fluid level information and hydrocarbon deposits build up in chamber 42. After at least some hydrocarbon deposits have built up in chamber 42, the operation of the separator vessel 12 and liquid level control is stopped. Subsequently, the hydrocarbon deposits are cleaned out of chamber 42 without disconnecting the liquid level controller 20 from the separator vessel 12 and without disconnecting the displacer arm assembly 26 from the pilot assembly 24.

Typically, the process will include renewing operation of the separator vessel 12 and liquid level controller 20 after the step of cleaning out hydrocarbon. Also, the step of cleaning out the hydrocarbon deposits can further comprise removing plug 50 from the clean-out port 48 so as to access chamber 42. During operation, separator vessel 12 and chamber 42 can be pressurized above atmospheric pressure. If so, the step of stopping operation comprises depressurizing separator vessel 12 and chamber 42. The apparatus and process of the current disclosure are suitable for use with such pressurized vessels, additionally with ones using pressure close valves and that require indirect operation of the control of liquid level.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

Therefore, the present systems and methods are well adapted to attain the ends and advantages mentioned, as well as those inherent therein. Any examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A liquid level controller comprising;
a pilot assembly; and
a displacer arm assembly operably attached to the pilot assembly, the displacer arm assembly having:
a mounting body configured for connection to a separator vessel, the mounting body defining a chamber at least partially containing a displacer arm, the chamber in fluid flow communication with the separator vessel when the mounting body is connected to the separator vessel, and wherein the mounting body has a clean-out port configured to allow access to the chamber for cleaning hydrocarbon deposits out of the chamber wherein the hydrocarbon deposits accumulate when the liquid level controller is operated in connection with the separator vessel; and
the displacer arm which, during use with the separator vessel, extends through at least a portion of the chamber and into the separator vessel.

2. The liquid level controller of claim 1, wherein the clean-out port is configured to allow access to the chamber for cleaning hydrocarbon deposits out of the chamber without removal of the mounting body from the separator vessel and without removal of the mounting body from the pilot assembly.

3. The liquid level controller of claim 1, wherein the mounting body has a first end, which during use is connected to the separator vessel with the displacer arm extending through at least a portion of the chamber and into the separator vessel, and an opposing second end, and wherein the clean-out port is located at the second end.

4. The liquid level controller of claim 1, wherein the displacer arm assembly further comprises a removal plug, which seals the clean-out port during operation of the liquid level controller, and which can be removed during clean-out of the chamber.

5. The liquid level controller of claim 4, wherein the removal plug is screw mounted into the clean-out port.

6. The liquid level controller of claim 5, wherein the clean-out port is configured to allow access to the chamber for cleaning hydrocarbon deposits out of the chamber without removal of the mounting body from the separator vessel and without removal of the mounting body from the pilot assembly.

7. The liquid level controller of claim 6, wherein the mounting body is tubular and the chamber is generally tubular so that the mounting body has a first end, which during use is connected to the separator vessel with the displacer arm extending through at least a portion of the chamber and into the separator vessel, and an opposing second end, and wherein the clean-out port is located at the second end.

8. The liquid level controller of claim 1, wherein:
the mounting body has a first end, which during use is connected to the separator vessel with the displacer arm extending through at least a portion of the chamber and into the separator vessel, and an opposing second end, and wherein the clean-out port is located at the second end;
the chamber is defined by a wall; and
the mounting body and the clean-out port are configured to allow access to the chamber so as to allow cleaning of the hydrocarbon deposits from the displacer arm and the wall of the chamber.

9. The liquid level controller of claim 8, wherein the mounting body and clean-out port are configured to allow access to the chamber for cleaning hydrocarbon deposits from the displacer arm and the wall of the chamber without removal of the mounting body from the separator vessel and without removal of the mounting body from the pilot assembly.

10. A process for operating a liquid level controller, the process comprising;
attaching a liquid level controller to a separator vessel so as to monitor fluid level within the separator vessel, wherein the liquid level controller includes;
a pilot assembly; and
a displacer arm assembly operably attached to the pilot assembly, the displacer arm assembly having:
a mounting body configured for connection to the separator vessel, wherein the mounting body defines a chamber at least partially containing a displacer arm; and
the displacer arm which moves in relation to fluid level in the separator vessel and is operably connected to the pilot assembly so as to convey fluid level information to the pilot assembly;
operating the separator vessel and liquid level controller, wherein during such operation the displacer arm conveys the fluid level information and hydrocarbon deposits build up in the chamber;

stopping operation of the separator vessel and liquid level controller; and cleaning out the hydrocarbon deposits without disconnecting the liquid level controller from the separator vessel and without disconnecting the displacer arm assembly from the pilot assembly.

11. The process of claim 10, wherein after the step of cleaning out hydrocarbon deposits the process comprising renewing operation of the separator vessel and liquid level controller.

12. The process of claim 10, wherein the chamber in fluid flow communication with the separator vessel when the mounting body is connected to the separator vessel, and wherein the mounting body has a clean-out port configured to allow access to the chamber for cleaning hydrocarbon deposits out of the chamber.

13. The process of claim 12, wherein the step of cleaning out the hydrocarbon deposits further comprises removing a plug from the clean-out port so as to access the chamber.

14. The process of claim 13, wherein during operation the separator vessel and the chamber are pressurized above atmospheric pressure and wherein the step of stopping operation comprises depressurizing the separator vessel and the chamber.

15. The process of claim 12, wherein the chamber is defined by a wall, and wherein the mounting body and wherein the step of cleaning out the hydrocarbon deposits comprises accessing the chamber through the clean-out port so as to remove the hydrocarbon deposits from the displacer arm and the wall of the chamber.

\* \* \* \* \*